United States Patent
Pelissier et al.

(10) Patent No.: US 9,594,506 B2
(45) Date of Patent: Mar. 14, 2017

(54) DATA QUEUE HAVING AN UNLIMITED DEPTH

(71) Applicant: STMicroelectronics (Grenoble 2) SAS, Grenoble (FR)

(72) Inventors: Gilles Pelissier, Eybens (FR); Jean-Philippe Cousin, Quaix en Chartreuse (FR); Badr Bentaybi, Bevenais (FR)

(73) Assignee: STMICROELECTRONICS (GRENOBLE 2) SAS, Grenoble (FR)

( * ) Notice: Subject to any disclaimer, the term of this patent is extended or adjusted under 35 U.S.C. 154(b) by 337 days.

(21) Appl. No.: 14/309,680

(22) Filed: Jun. 19, 2014

(65) Prior Publication Data
US 2014/0379999 A1    Dec. 25, 2014

(30) Foreign Application Priority Data

Jun. 21, 2013 (FR) ..................... 13 55903

(51) Int. Cl.
G06F 12/00 (2006.01)
G06F 3/06 (2006.01)
G06F 9/54 (2006.01)

(52) U.S. Cl.
CPC ............ *G06F 3/0604* (2013.01); *G06F 3/067* (2013.01); *G06F 3/0655* (2013.01); *G06F 9/546* (2013.01); *G06F 2003/0697* (2013.01)

(58) Field of Classification Search
CPC ................................................ G06F 12/023
USPC ....................................................... 711/147
See application file for complete search history.

(56) References Cited

U.S. PATENT DOCUMENTS

| 5,333,269 | A | * | 7/1994 | Calvignac | .............. G06F 9/544 709/215 |
| 5,371,850 | A | | 12/1994 | Belsan et al. | |
| 7,130,936 | B1 | | 10/2006 | Baines et al. | |
| 8,108,571 | B1 | | 1/2012 | Bouvier | |

(Continued)

FOREIGN PATENT DOCUMENTS

| EP | 0 365 731 A1 | 5/1990 |
| EP | 1 262 870 A1 | 12/2002 |

OTHER PUBLICATIONS

French Search Report, dated Mar. 10, 2014, for French Application No. FR 1355903, 2 pages.

*Primary Examiner* — Ryan Bertram
*Assistant Examiner* — Edmund Kwong
(74) *Attorney, Agent, or Firm* — Seed IP Law Group LLP

(57) ABSTRACT

A method for transferring messages from a producer element to a consumer element uses a memory shared between the producer element and the consumer element, and a hardware queue including several registers designed to contain addresses of the shared memory. The method includes the steps of storing each message for the consumer element in the shared memory in the form of a node of a linked list, including a pointer to a next node in the list, the pointer being initially void, writing successively the address of each node in a free slot of the queue, whereby the node identified by each slot of the queue is the first node of a linked list assigned to the slot, and when the queue is full, writing the address of the current node in memory, in the pointer of the last node of the linked list assigned to the last slot of the queue, whereby the current node is placed at the end of the linked list assigned to the last slot of the queue.

17 Claims, 4 Drawing Sheets

(56) References Cited

U.S. PATENT DOCUMENTS

2009/0249357 A1    10/2009    Chanda et al.

* cited by examiner

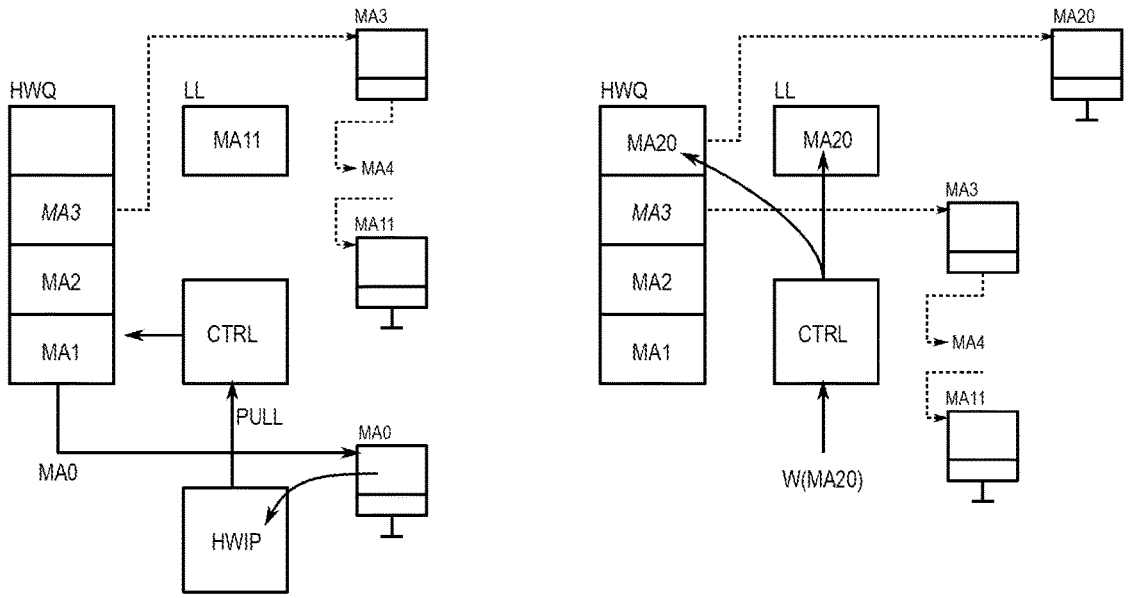
Fig 3A
Fig 3B
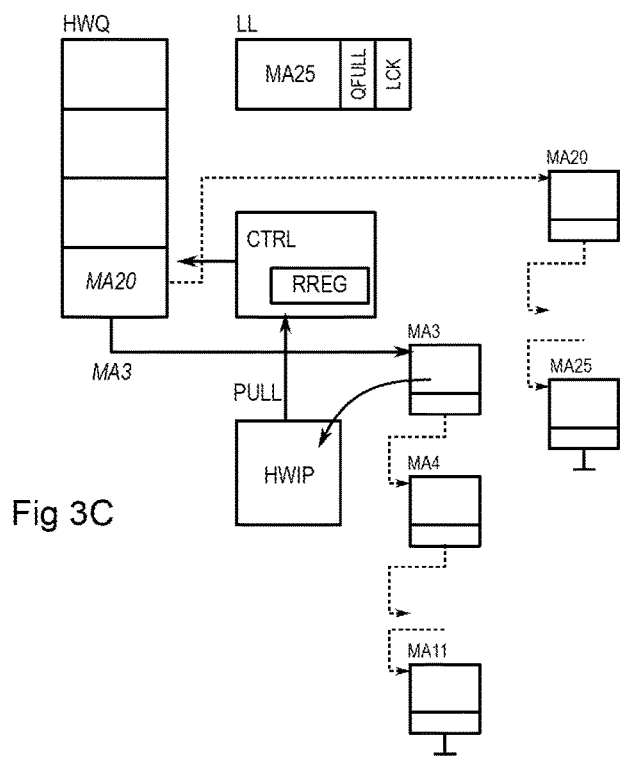
Fig 3C

DATA QUEUE HAVING AN UNLIMITED DEPTH

BACKGROUND

Technical Field

The disclosure relates to a multi-tasking system in which several data producing tasks may send messages to a consumer element asynchronously. The disclosure relates more particularly to a queue structure configured to sort the messages so that the consumer element may process them sequentially according to its availability.

Description of the Related Art

FIG. 1A is a block diagram of an exemplary multiprocessor system. The system may include several processors P0, P1 . . . Pn, a shared memory SMEM and a peripheral device 10, connected together by an interconnecting device CONN, for instance a bus.

The device 10 may be a consumer element, for example a network interface, a mass storage interface, a graphical user interface, etc. The consumer device may receive data generated by one or more processors. Such a device may typically handle multiple data streams and offer several types of processing. Thus, the data is provided to device 10 together with processing parameters. The parameters may be provided in the form of "messages." A message may contain the data to be processed or identify a slot in the memory SMEM. Where the peripheral device manages DMA ("Direct Memory Access") transfers with memory SMEM, messages may only contain the parameters of the transfer.

The consumer device 10 includes a core hardware intellectual property HWIP block that processes the messages. This core is usually designed to process messages asynchronously, and cannot absorb a burst of messages sent by multiple processors. The device 10 includes a write queue 12 where the messages of the burst are stored until the core HWIP can process them.

In this context, the designer faces the recurrent difficulty of sizing the hardware write queue 12. If the queue is too shallow, data producer elements (processors) often stall to wait for slots to be freed in the queue. If processor stalls are to be avoided altogether, the queue depth may reach such a large value that the queue occupies an unreasonable surface area on the circuit. This difficulty is exacerbated when the messages are of variable size.

To push back the stalling limits of data producing processors while using a shallow hardware queue, U.S. Pat. No. 8,606,976 to Desoli et al. proposes a mechanism where the queue may overflow into the system memory; into a software managed queue. The overflow is performed in a reserved memory area of fixed size. This solution pushes back the stalling limit for the production of data, but does not eliminate it. The reserved memory area, whether used or not, is permanently removed from the available space for other applications in the system memory.

BRIEF SUMMARY

It is therefore desirable to push back further the stalling limit of data production or to remove the limit altogether, while limiting the depth of the hardware queues and without reserving unused space in the system memory.

This is addressed by a method for transferring messages from a producer element to a consumer element using a memory shared between the producer element and the consumer element, and a hardware queue including several registers designed to contain addresses of the shared memory, the method comprising the steps of storing each message for the consumer element in the shared memory in the form of a node of a linked list, including a pointer to a next node in the list, the pointer being initially void; writing successively the address of each node in a free slot of the queue, whereby the node identified by each slot of the queue is the first node of a linked list assigned to the slot; and when the queue is full, writing the address of the current node in memory, in the pointer of the last node of the linked list assigned to the last slot of the queue, whereby the current node is placed at the end of the linked list assigned to the last slot of the queue.

According to an embodiment, the method comprises the steps of updating an auxiliary register with the address of the current node when writing the address of the current node in the hardware queue or in a pointer; and when the queue is full, writing the address of the current node in memory, in the pointer of the node identified by the auxiliary register.

According to an embodiment, the method comprises the steps of writing the addresses of the nodes in the queue by several producer elements; activating a queue full flag in the auxiliary register by the consumer element when the last slot of the queue is unavailable; upon each reading of the auxiliary register by a producer element, activating a lock flag in the auxiliary register by the consumer element if the queue full flag is active; upon each updating of the auxiliary register by the producer element, disabling the lock flag by the consumer element; reading the contents of the auxiliary register by a current producer element; if the current producer element sees the lock flag inactive, writing, by the current producer element, the address of the current node in memory, in the pointer of the node identified by the auxiliary register, and updating the auxiliary register; and if the current producer element sees the lock flag active, repeating the step of reading the contents of the auxiliary register later.

According to an embodiment, the method comprises, each time the lock flag is disabled, reporting by the consumer element that the producer elements can renew reading of the auxiliary register by enabling a line distributed to all producer elements.

According to an embodiment, the method comprises the steps of incrementing a reservation register upon each reading of the auxiliary register; decrementing the reservation register each time a slot in the hardware queue is occupied; and enabling the queue full flag when the contents of the reservation register reaches the number of slots available in the queue.

According to an embodiment, the method comprises, each time a slot is freed in the hardware queue, disabling the queue full flag at the earliest when the lock flag is disabled.

According to an embodiment, the method comprises the following steps implemented in the consumer element: successively reading each slot in the queue; freeing each slot as soon as it is read; reading the node at the address contained in the current slot of the queue and processing the message of the node; if the pointer of the node contains an address, iterating from the previous step with the address contained in the pointer.

According to an embodiment, the method comprises the following step implemented in the consumer element: suspending reading of the last slot of the queue as long as the lock flag is active.

BRIEF DESCRIPTION OF THE SEVERAL VIEWS OF THE DRAWINGS

Other advantages and features will become more clearly apparent from the following description of particular embodiments of the invention provided for exemplary purposes and represented in the appended drawings. Non-limiting and non-exhaustive embodiments are described with reference to the following drawings, wherein like labels refer to like parts throughout the various views unless otherwise specified. One or more embodiments are described hereinafter with reference to the accompanying drawings in which:

FIGS. 3A-3C show the unlimited depth queue structure in various emptying stages.

DETAILED DESCRIPTION

Figure 1A:
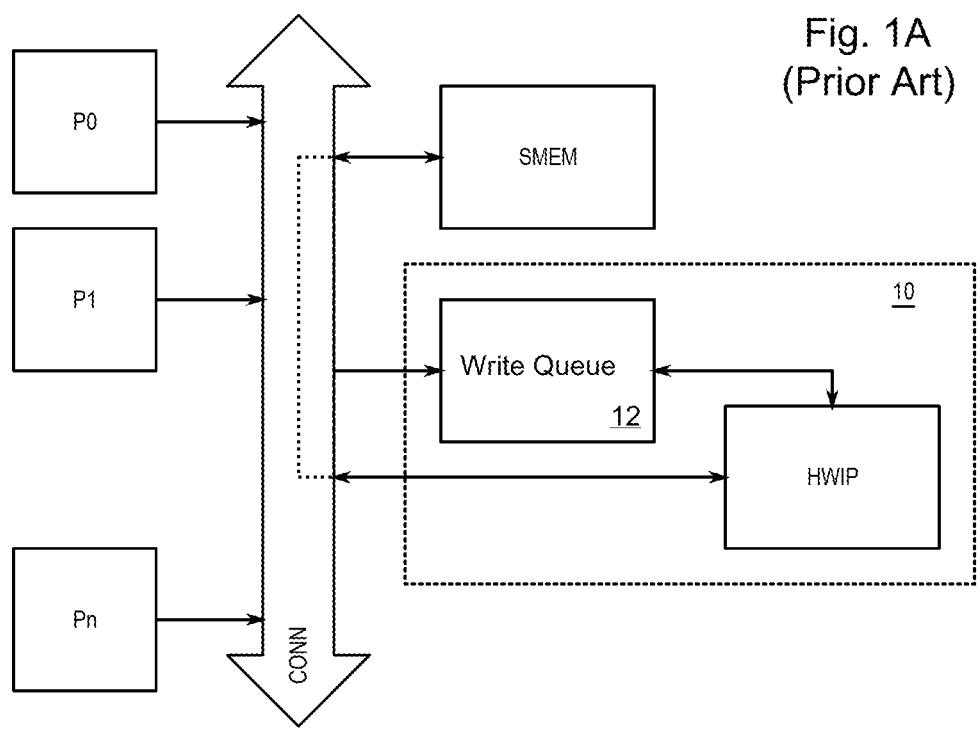
FIG. 1A, previously described, is a block diagram of an exemplary multiprocessor system.
Figure 1B:
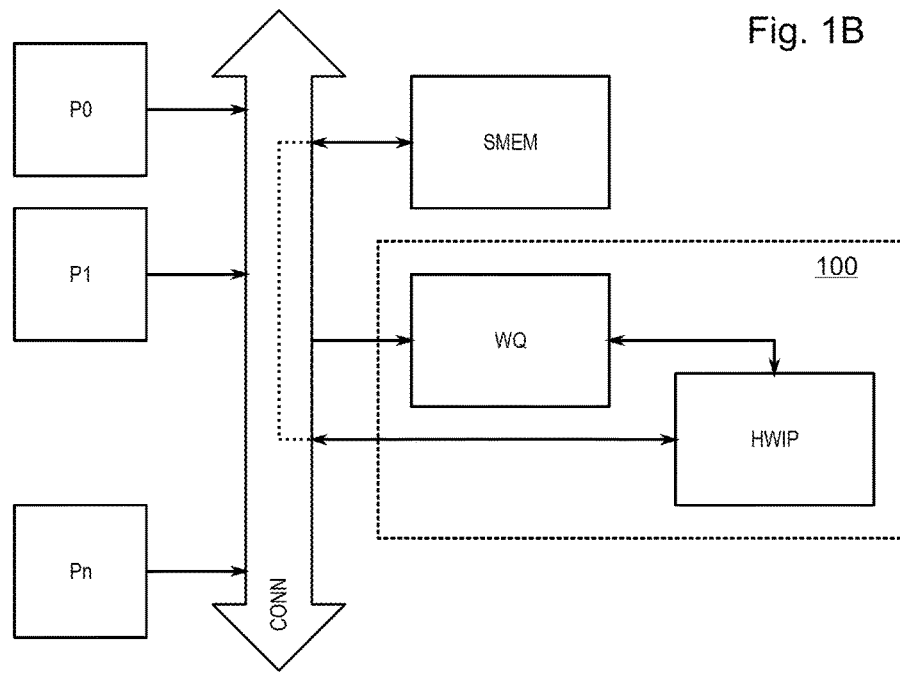
FIG. 1B is a block diagram of an exemplary multiprocessors system employed with a data queue having an unlimited depth.

FIG. 1B is a block diagram of an exemplary multiprocessor system employed with a data queue having an unlimited depth. The system may include several processors P0, P1 . . . Pn, a shared memory SMEM and a peripheral device 100, connected together by an interconnecting device CONN, for instance a bus.

The device 100 may be a consumer element, for example a network interface, a mass storage interface, a graphical user interface, etc. The consumer device may receive data generated by one or more processors. Such a device may typically handle multiple data streams and offer several types of processing. Thus, the data is provided to device 100 together with processing parameters. The parameters may be provided in the form of "messages." A message may contain the data to be processed or identify a slot in the memory SMEM. Where the peripheral device manages DMA ("Direct Memory Access") transfers with memory SMEM, messages may only contain the parameters of the transfer.

The consumer device 100 includes a core hardware intellectual property HWIP block that processes the messages. This core is usually designed to process messages asynchronously, and cannot absorb a burst of messages sent by multiple processors. The device 100 includes a write queue WQ where the messages of the burst are stored until the core HWIP can process them.

A system of the type of FIG. 1B is considered, where the messages, i.e., the data together with their processing parameters, are transmitted by the processors P to peripheral device 100 via the shared memory SMEM. More specifically, the processors are programmed to write each message in the shared memory as a node of a linked list. The node includes a pointer designed to contain the address of the next node in the list. The processor provides a void value for the pointer, whereby each message is initially written in the memory as a distinct linked list having a single node.

The memory is dynamically allocated to messages or nodes at the time of writing, whereby no memory space that can potentially remain unused is reserved. The number of nodes is limited only by the memory available to allocate nodes. The nodes may be of variable size.

As the messages are written in the memory, they are preferably available for reading without delay by device 100. The processor could be programmed to build a single linked list from the messages it writes, and provide the address of the first node to device 100. The linked list would be a software queue, requiring an inefficient management in terms of performance. In addition, the management of the linked list would become particularly complex in practice, where multiple processors write messages at the same time.

Instead, the consumer device 100 includes a hybrid queue structure, combining the speed of a hardware queue and the flexibility of a software queue. More specifically, when the hardware queue is full, it is made to overflow into a software queue in the form of a linked list.

FIGS. 2A-2F illustrate more specifically the operation of an embodiment of such a hybrid queue in different examples of filling phases. The hybrid queue comprises a hardware queue HWQ, for example a FIFO, a control circuit CTRL, and an auxiliary register LL. The queue HWQ is configured to contain addresses of messages (or nodes) in memory SMEM. In this example, the queue HWQ has four registers. Register LL is assigned to the last slot of queue HWQ and is designed to contain the address in memory SMEM of the last node of a linked list associated with the last slot of the queue, i.e., the address of the last message written in the hybrid queue.

The figures also show the states of two flags QFULL and LCK, which will be described later in connection with another embodiment of a hybrid queue.

Figure 2A:
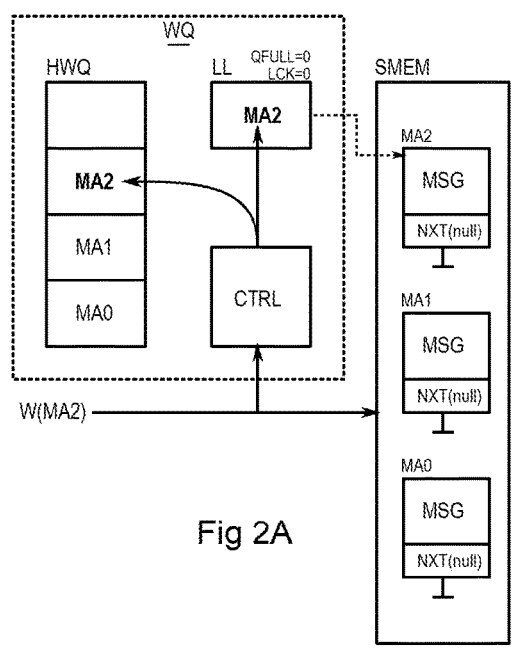
FIGS. 2A to 2F show a structure of an unlimited depth queue in various filling stages.

In FIG. 2A, a processor writes (W(MA2)) a message in the memory SMEM at address MA2. The message is written in the form of a linked list node, including the message MSG itself and a pointer NXT containing the address of the next node in the list. The NXT pointer is initially empty (null). The control circuit CTRL may be connected to the system bus and designed to identify the writing of messages to the attention of the device. Identifying the destination of messages may be achieved using MSBs of the address lines that are not used by the memory SMEM.

The control circuit takes the address MA2 from the bus and writes it in both the queue HWQ and the LL register. As shown, the queue HWQ already contained two addresses, MA0 and MA1, corresponding to two nodes of same names previously written in memory SMEM. The address MA2 is written in the next available slot, in the third place. Register LL contains a single address—it is updated with the current address MA2.

Figure 2B:
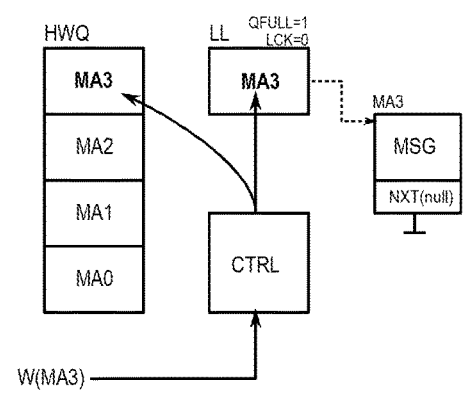

In FIG. 2B, the next message is written at address MA3 of memory SMEM. This address is taken from the bus by control circuit CTRL and written in both the LL register and in the next free slot of the queue HWQ. The queue HWQ is now full. (To simplify the figures, only the modified contents of the memory SMEM are shown hereafter.)

Figure 2C:
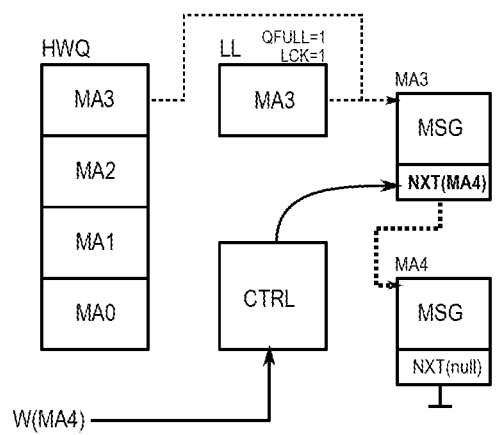
Figure 2D:
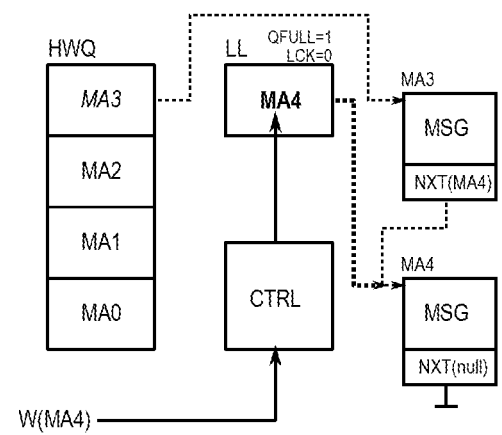

FIGS. 2C and 2D illustrate two phases of operation when a message is written whereas the last slot of queue HWQ has just been taken. The current message is written at address MA4, while the last slot of the queue contains the address MA3.

In FIG. 2C, the control circuit CTRL takes the address MA4 from the bus and finds the queue HWQ full. It then writes the address MA4 in memory, in the NXT pointer of the node identified by the LL register, containing address MA3. The content of the LL register is then updated with address MA4.

Through these operations, the current node MA4 is inserted as the last element of a linked list having node MA3 as the first element. The LL register identifies node MA4 as the last node of the list. Address MA3 contained in the queue, written in italics, identifies the first node of a linked list that now contains more than one node.

As long as the queue HWQ does not begin to empty, the subsequent messages are processed in the same manner, extending the linked list.

Figure 2E:
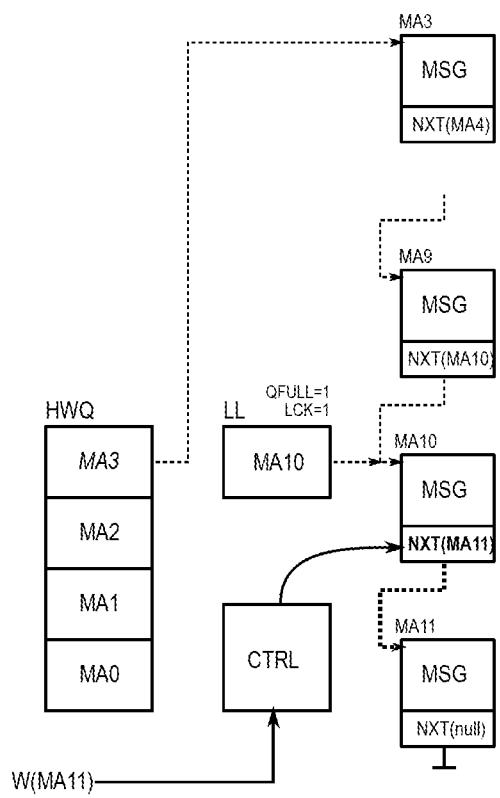
Figure 2F:
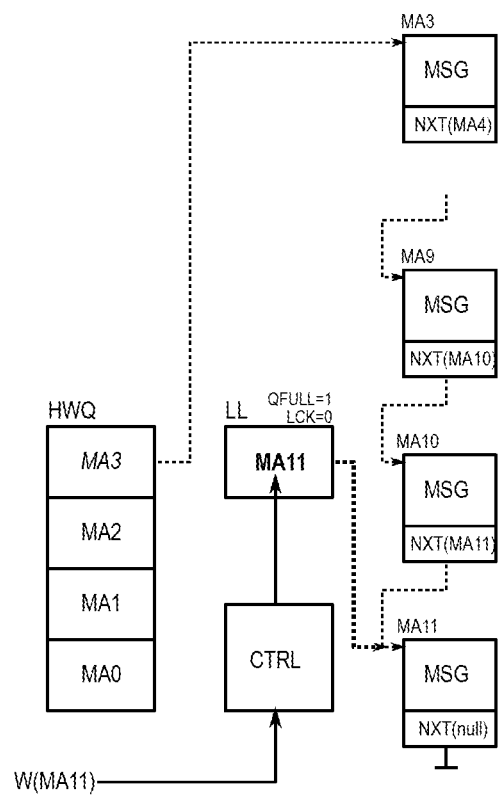

In FIGS. 2E and 2F, a message is written at address MA11 while the queue has not begun to empty. The control circuit writes address MA11 in the NXT pointer of the node identified by the LL register, node MA10, and updates the LL register with address MA11. Now the address MA3 contained in the queue identifies a linked list starting with node MA3 and ending with node MA11.

This linked list may grow within the space available in the memory SMEM, without having previously allocated memory. If the available memory space happens to be insufficient, the system may switch to a conventional full queue management mode, such as by suspending the production of messages by the processors.

FIGS. 3A-3C illustrate different phases during the emptying of the hybrid queue, starting from the position of FIG. 2F.

In FIG. 3A, when the core HWIP of the peripheral device is ready to process a message, it sends a PULL signal to control circuit CTRL. The control circuit pulls the first queue element, here the address MA0, and frees the slot. This address is used to read the contents of node MA0 (the message MSG and the NXT pointer) in memory SMEM. The message is retrieved by the core HWIP, and the NXT pointer, here void, indicates the end of the linked list.

In FIG. 3B, the freed slot is occupied immediately by a new message written at the address MA20, according to the mechanism described in connection with FIG. 2B: the address MA20 is written in both the last slot of the queue and in the LL register. Thus, the LL register identifies the newly written node MA20 as the last node of a new linked list. The node MA20 is also the first node of the new list. A new list thus starts each time the last slot of the queue is freed and then reoccupied. This list assigned to the last slot of the queue remains "open" as long as the last slot is occupied by the same address. The list that was started at address MA3 is "closed" because the address MA3 left the last slot of the queue.

In FIG. 3C, the queue has been emptied of several elements. The core HWIP pulls the address MA3 from the queue. The address MA3 is used to read the contents of the node with the same name in memory SMEM. The corresponding message is provided for processing to the core. The NXT pointer is not void this time: It contains address MA4. This address MA4 is used for reading the next node of the list in memory, and retrieving the corresponding message and pointer therein. These operations are repeated until the retrieved NXT pointer is void, which happens in the example for the node MA11. At this stage the messages from all the nodes in the linked list have been read from memory and sorted for processing by core HWIP.

The queue slot containing the address MA3, although the processing of the corresponding linked list may take several cycles, can be freed as soon as the address MA3 is pulled, i.e., as soon as the first node of the list is identified. Indeed, once the node MA3 has been processed, the next node is identified by the NXT pointer of the current node, whereby the information contained in the queue is no longer needed.

In this example, the linked list started at FIG. 3B was extended by several nodes, the last one having the address MA25. No new message having been written up to the stage of FIG. 3C, the LL register still contains the address MA25. This address will not be used and will be overwritten at the arrival of a new message in the queue.

It may thus be noted that, depending on the circumstances, each slot of the queue can identify the first node of a linked list of any length. Improved performance may be achieved when the linked lists contain only one element.

Then, when writing a message, the only operation performed is writing its address in both the queue and the LL register simultaneously, which can occur in the same cycle as writing the message in the shared memory. When the queue is full, the pointer to the last node of the list is updated in memory, which represents a second memory access after the one used to write the message.

Upon reading the messages, the NXT pointer is read in addition to each message. The performance impact depends on the length of messages. If the messages are long and require several cycles for reading, additionally reading the pointer may have little impact. The impact may be zero if the message is not aligned with the width of the memory bus and the pointer fits in the unused portion of the bus.

In the foregoing description, it was assumed that the hybrid queue had built-in intelligence, in particular the control circuit CTRL, capable of carrying out most of the described operations, for example by using a microcontroller that the peripheral device includes for performing its own functions. In some applications, the peripheral device is basic and does not have a microcontroller. In this case, it is desired that the queue management operations are carried out by the processors themselves, assisted by a functionality within the control circuit CTRL, achievable by a simple state machine. One then faces a problem of concurrent accesses to the hardware queue HWQ and LL register by multiple processors.

To manage the access, the LL register may include, as shown in FIG. 3C, two flags in addition to the address of the last message. Both flags may be address bits not used by the system. A first flag QFULL indicates that the hardware queue is full, and a second lock flag LCK prevents changing the content of LL register while a pointer update is in progress. Thus, the LCK flag can only be enabled while the QFULL flag is active.

Preferably, the QFULL flag remains active as long as the LCK flag is active, even if a slot of the queue is freed in the meantime. This last condition prevents another processor from writing a new element in the queue while the previous processor has not finished updating the pointer to the last node of the list in memory. This ensures that the LL register always contains the address of the last message written in the hybrid queue.

In addition, the circuit CTRL, a state machine, may include a reservation register RREG, whose role will be explained later.

FIGS. 2A to 2D are now described assuming that the processors handle reading and writing in the registers and memory, and that the state machine CTRL only manages the filling of the hardware queue HWQ and the updating of flags QFULL and LCK. The states of flags QFULL and LCK are shown in each figure.

In the case of FIG. 2A, flags QFULL and LCK are inactive. The processor writes the message MA2 in memory and reads the contents of LL register. LL register indicates that the queue is not full, whereby the processor writes the address MA2 in the queue and in the LL register.

In FIG. 2B, the processor encounters the same conditions as in FIG. 2A. LL register indicates that the queue is not full, whereby the processor writes the address MA3 of the current message in the queue and in the LL register. The queue is now full, which activates the QFULL flag by the state machine CTRL.

In FIG. 2C, the processor reads the LL register and sees the QFULL flag active and the LCK flag inactive. The processor is in control to manage the linked list assigned to the last slot, and the state machine enables the LCK flag. The processor writes the address of the current message, MA4, in the pointer of node MA3, whose address was retrieved in the LL register. This operation may take a few cycles over the bus—in the meantime, another processor could acquire control of the bus to write a message. The other processor polls the LL register and sees the LCK flag activated—it waits to poll the LL register again later.

Once the linked list has been updated (FIG. 2C) and the address of the current message, MA4, has been written in the LL register (FIG. 2D), the state machine disables the LCK flag. Processors that are waiting are notified of the event, for example using a dedicated bus line distributed to all processors, after which they again poll the LL register. The first processor that polls the LL register and sees the LCK flag inactive gains control and causes a new activation of the LCK flag, whereby the other processors see this flag active and continue waiting.

In practice, "polling" the LL register by a processor consists of multiple operations on the bus, in particular sending a read request and receiving the requested value. In some systems, these operations are not atomic, nor consecutive, whereby the bus is released for other operations between the read request and the receipt of the requested value. Transient states may then be encountered, for example between FIGS. 2A and 2B, where a second processor completes the poll of the LL register and sees the QFULL flag inactive before the first processor has written its value in the hardware queue and caused the activation of the QFULL flag. Thus, if no precautions are taken, the second processor may see the QFULL flag inactive whereas it should be seen active after the operation of the first processor. Depending on the management of the hardware queue HWQ implemented by the state machine CTRL, the value written by the second processor is lost or written over the value of the first processor.

In this situation, it is desired that the QFULL flag be activated in anticipation of a filling of the hardware queue, before the hardware queue is actually full. To achieve this, a reservation mechanism may be provided that counts the number of consecutive times the QFULL flag can be returned as inactive according to the available slots in the hardware queue and the number of slots that have been previously "reserved". The state machine CTRL then includes a reservation register RREG (FIG. 3C) that is incremented each time the LL register is polled while the current value of the reservation register is less than the number of available slots in the hardware queue. The reservation register is decremented when the LL register is updated and the corresponding slot is actually taken in the hardware queue. The QFULL flag is enabled as soon as the number of reserved slots reaches the number of available slots in the hardware queue.

The reading of the hybrid queue and of the messages can continue to be achieved by the core HWIP of the device. These operations require no complex queue management and are achievable by a simple state machine. As soon as the core reads an address in the queue, the state machine CTRL frees the slot of the hardware queue. Preferably, as previously mentioned, this operation does not directly cause the deactivation of the QFULL flag. The QFULL flag will be disabled when the LCK flag is disabled. It is preferable that the core HWIP suspends reading the last slot of the queue as long as the lock flag LCK is active, i.e., as long as the processor currently updating the last linked list has not completed.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method, comprising:
sharing a memory between a producer element and a consumer element; and
transferring a plurality of messages from the producer element to the consumer element using the shared memory and a hardware queue, the hardware queue having a plurality of registers to store addresses of the shared memory, wherein using the hardware queue includes:
storing each message of the plurality of messages in the shared memory as a node of a linked list, each node of the linked list including a pointer to a next node in the linked list, each pointer to the next node being initially void;
writing successively a memory address of each node of the linked list in a respective free slot of the hardware queue to create a respective occupied slot of the hardware queue, whereby each linked list node identified by its respective occupied slot of the hardware queue is a first node of a respective linked list, each respective linked list assigned to the respective occupied slot of the hardware queue; and
when the hardware queue is full, writing an address of a current node stored in the shared memory into a pointer of a last node of a respective last linked list assigned to a last occupied slot of the hardware queue, whereby the current node is placed at an end of the respective last linked list assigned to a last occupied slot of the hardware queue; and
wherein transferring the plurality of messages includes:
successively reading, by the consumer element, every slot in the hardware queue;
freeing, by the consumer element, each slot in the hardware queue when the respective slot in the hardware queue is read;
reading, by the consumer element, the node at the memory address stored in a current slot of the hardware queue and processing a message of the node; and
if the pointer of the node contains a memory address, iterating, by the consumer element, from the act of reading the node with the memory address contained in the pointer.

2. The method of claim 1, comprising:
updating an auxiliary register with the address of the current node stored in the shared memory when writing the address of the current node stored in the shared memory into the hardware queue or into the pointer of the last node; and
when the hardware queue is full, writing the address of the current node stored in the shared memory, into the pointer to the next node of the node identified by the auxiliary register.

3. The method of claim 2, comprising:
writing addresses of nodes into the hardware queue by a plurality of producer elements;

activating a queue full flag in the auxiliary register by the consumer element when the last occupied slot of the hardware queue is unavailable;

upon each reading of the auxiliary register by one of the plurality of producer elements, activating a lock flag in the auxiliary register by the consumer element if the queue full flag is active;

after each updating of the auxiliary register by the one of the plurality of producer elements, disabling the lock flag by the consumer element;

reading the contents of the auxiliary register by a current producer element of the plurality of producer elements;

if the current producer element of the plurality of producer elements detects the lock flag inactive, writing, by the current producer element of the plurality of producer elements, the address of the current node stored in the shared memory, into the pointer to the next node of the node identified by the auxiliary register, and updating the auxiliary register; and if the current producer element of the plurality of producer elements detects the lock flag active, repeating the reading of the auxiliary register at a later time.

4. The method of claim 3, comprising:

each time the lock flag is disabled, reporting an availability of the auxiliary register by the consumer element to the plurality of producer elements by enabling a line distributed to the plurality of producer elements.

5. The method of claim 3, comprising:

incrementing a reservation register upon each reading of the auxiliary register;

decrementing the reservation register upon creation of each respective occupied slot of the hardware queue; and enabling the queue full flag when a value in the reservation register reaches a number of slots available in the hardware queue.

6. The method of claim 3, comprising:

when an occupied slot of the hardware queue is freed, disabling the queue full flag no earlier than when the lock flag is disabled.

7. The method of claim 6, comprising:

suspending, by the consumer element, reading of a last slot of the hardware queue while the lock flag is active.

8. A multiprocessor system, comprising:

a consumer element;

an interconnection device coupled to the consumer element;

a shared memory;

a hardware queue, the hardware queue having a plurality of registers to store addresses of the shared memory;

a plurality of producer elements configured to transfer a plurality of messages to the consumer element across the interconnection device using the shared memory and the hardware queue, wherein the plurality of producer elements are configured to store each message in the shared memory as a node of a linked list, each node of the linked list including a pointer to a next node in the linked list, each pointer to the next node arranged to be initially void, wherein the plurality of producer elements are configured to direct successive write operations of a memory address of each first node of the linked list into a respective free slot of the hardware queue to create a respective occupied slot of the hardware queue, whereby each linked list node identified by its respective occupied slot of the hardware queue is a first node of a respective linked list, each respective linked list assigned to the respective occupied slot of the hardware queue, wherein, when the hardware queue is full, the plurality of producer elements are configured to direct a write operation to store an address of a current node stored in the shared memory into a pointer of a last node of a respective last linked list assigned to a last occupied slot of the hardware queue, whereby the current node is placed at an end of the respective last linked list assigned to a last occupied slot of the hardware queue; and an auxiliary register updateable with the address of the current node stored in the shared memory when writing the address of the current node stored in the shared memory into the hardware queue or into the pointer of the last node, and wherein, when the hardware queue is full, writing the address of the current node stored in the shared memory into the pointer to the next node of the node identified b the auxiliary register, wherein the auxiliary register includes a queue full flag and a lock flag, and wherein the consumer element is configured to activate the queue full flag when the last occupied slot of the hardware queue is unavailable, and wherein, upon each reading of the auxiliary register, the consumer element is configured to activate the lock flag if the queue full flag is active, wherein the consumer element is configured to disable the lock flag after each updating of the auxiliary register, and wherein the current producer element is configured to detect if the lock flag inactive and direct a write operation of the address of the current node stored in memory into the pointer to the next node of the node identified by the auxiliary register, and wherein the current producer element is configured to detect if the lock flag active and repeat the reading of the auxiliary register at a later time.

9. The multiprocessor system of claim of claim 8, wherein the consumer element is configured to report an availability of the auxiliary register each time the lock flag is disabled by enabling a line distributed to the plurality of producer elements.

10. The multiprocessor system of claim 8, comprising:

a reservation register, wherein the consumer element is configured to increment the reservation register upon each reading of the auxiliary register, decrement the reservation register upon creation of each respective occupied slot of the hardware queue, and enable the queue full flag when a value in the reservation register reaches a number of slots available in the hardware queue.

11. The multiprocessor system of claim 8, wherein the consumer element is configured to disable the queue full flag and disable the lock flag when an occupied slot of the hardware queue is freed.

12. The multiprocessor system of claim 8, wherein the hardware queue is formed as part of the consumer element.

13. The multiprocessor system of claim 8, wherein the auxiliary register is formed as part of the consumer element.

14. The multiprocessor system of claim 8, comprising:

a reservation count register formed as part of the consumer element; and a controller formed as part of the consumer element, the controller configured to manage the reservation count register.

15. A write queue system to manage message transfers between a plurality of processors and a consumer element, comprising:

an interconnection device configured to be coupled to a shared memory;

a hardware queue having a plurality of entries, wherein each entry of the plurality of entries is configured to store a pointer to a respective linked list in the shared memory, the plurality of entries including a last entry configured to be loaded after all other entries of the plurality of entries are loaded; and an auxiliary register, the auxiliary register configured to initially store a pointer to a linked list most recently stored in the shared memory, wherein each time the auxiliary register is read by a producer element:

a lock-flag in the auxiliary register is activated if a queue-full-flag is active;

the lock-flag is disabled each time the auxiliary register is updated; and if the producer element detects the lock-flag active, the producer element repeats the read of the auxiliary register at a later time.

16. The write queue system of claim 15, comprising:

a controller configured to manage pointers stored in the hardware queue such that after the last entry of the hardware queue is loaded, pointers to subsequent linked lists added to the shared memory are stored in the auxiliary register.

17. The write queue system of claim 16, wherein the controller is configured to manage access to the hardware queue and the shared memory by administering the queue-full-flag associated with the auxiliary register and the lock-flag associated with the auxiliary register.

* * * * *

UNITED STATES PATENT AND TRADEMARK OFFICE
CERTIFICATE OF CORRECTION

PATENT NO. : 9,594,506 B2  
APPLICATION NO. : 14/309680  
DATED : March 14, 2017  
INVENTOR(S) : Gilles Pelissier et al.

It is certified that error appears in the above-identified patent and that said Letters Patent is hereby corrected as shown below:

In the Claims

Column 10, Line 20:
"the node identified b the auxiliary register," should read, --the node identified by the auxiliary register,--.

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*